SILICON DIOXIDE SOLID CAPACITOR

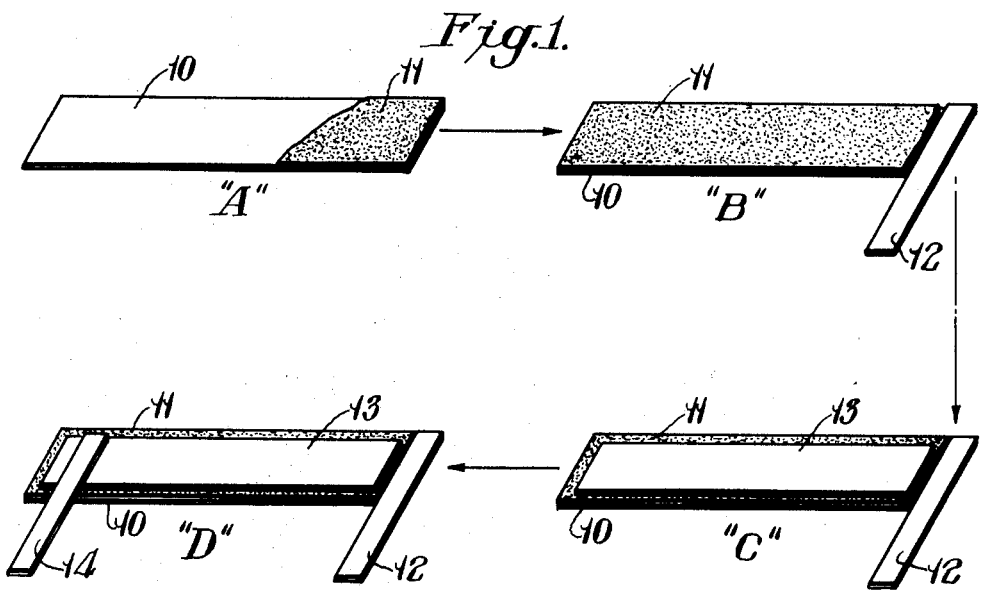
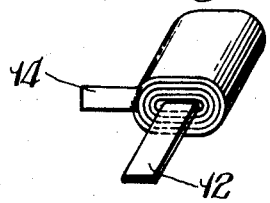
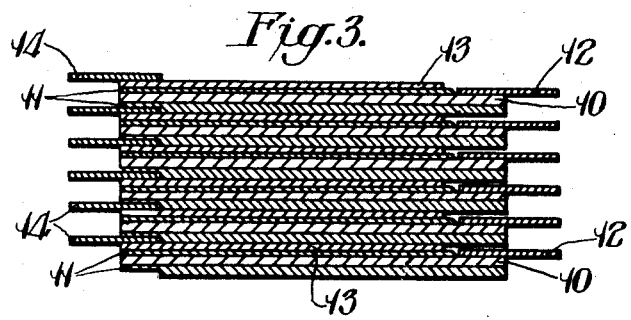
INVENTORS
John L. Sprague
John F. D'Amico
BY Connolly and Hutz
ATTORNEYS

John L. Sprague and John F. D'Amico, Williamstown, Mass., assignors to Sprague Electric Company, North Adams, Mass., a corporation of Massachusetts
Filed Aug. 10, 1961, Ser. No. 130,651
7 Claims. (Cl. 29—25.42)

This invention relates to a capacitor having a thin layer of silicon dioxide as the dielectric material, and more particularly to a capacitor in which a thin layer of silicon dioxide is formed as a dielectric material on a substrate material.

Silicon dioxide is a dielectric material capable of providing several excellent characteristics to a capacitor. A silicon dioxide capacitor has high stability with time and temperature change, and good frequency characteristics with a high Q and a low temperature coefficient. In short, silicon dioxide is an excellent dielectric material for capacitors. However, one problem is that a capacitor having silicon dioxide as a dielectric material is relatively limited in capacity.

It is known to the art that capacitance can be increased by various modifications of the silica body and the electrodes. These previous various methods for providing increased capacitance to capacitors employing silicon dioxide all have some shortcomings. The disadvantages include a high series resistance, an increased power factor and a decreasing Q at frequencies above 1000 cycles. It is important to provide capacitors having high capacity and high Q at high frequencies and at the same time at lower manufacturing costs. It is desired to provide such capacitors having silicon dioxide as the dielectric material.

It is an object of this invention to provide a solid state capacitor having silicon dioxide as the dielectric material with satisfactory characteristics.

It is a further object of this invention to provide a capacitor having a silicon dioxide dielectric material in a thin layer in intimate cooperation with conducting materials acting as electrodes.

It is a further object of this invention to provide a solid state electrical capacitor for extended operational use and high temperatures and high frequencies.

These and other objects of this invention will become more apparent upon consideration of the following description and claims taken together with the accompanying drawings, wherein:

FIGURE 1 shows a flow sheet representing the steps in the production of a capacitor according to this invention;

FIGURE 2 shows a rolled capacitor having a silicon dioxide dielectric according to this invention; and FIGURE 3 shows a stacked capacitor having a silicon dioxide dielectric according to this invention.

According to this invention, a stratum of silicon dioxide is created on a substrate. This stratum is desirably thin and only of sufficient thickness to provide the necessary electrical and dielectric properties. The dielectric silicon dioxide is combined into a capacitor by the application of satisfactory suitable electrodes on the opposite sides of the stratum with the connection of electrical leads to these electrodes.

A procedure for producing a silicon dioxide capacitor body is illustrated in FIGURE 1. In this method a metal strip is coated with silicon dioxide. The oxide is then removed from a portion of the metal strip and an electrode tab is attached to the metal strip at that portion. The surface of the oxide is then coated with a metal layer as by metallization. In the next step, a second tab is applied to the metallized electrode to complete the capacitive relationship. The two capacitor electrodes are separated by a very thin layer of silicon dioxide to result in good capacitance in a sturdy construction.

In step A of FIGURE 1, a metal strip 10 is shown coated with a thin layer 11 of silicon dioxide. At step B the metal strip 10 is shown with a small portion of the layer 11 removed and a tab 12 attached to the strip 10.

In step C, the metal strip 10 is metallized with a metallized layer 13 which overlies the layer 11 without contacting the tab 12. The layer 11 is interposed between the strip 10 and the metallized layer 13. A second tab 14 is shown attached to the layer 13 in step D. Thus, the capacitor is completed.

The individual capacitors may be assembled into a stack construction as shown in FIGURE 3 with a layer 11 of silicon dioxide to separate adjacent electrodes from each other and from the respective leads. As the thickness of the individual unit is relatively thin, a combined stack will provide a silicon dioxide capacitor of greatly increased capacitance in a small volume.

A rolled section may be provided from the silicon dioxide coated substrate strip 10. The silicon dioxide layer is flexible and lends itself to a rolled body construction. FIGURE 2 shows a rolled capacitor section made up of turns of the capacitor construction such as illustrated in FIGURE 1. The adjacent electrodes are suitably insulated from each other by the silicon dioxide layer 11 on both surfaces of substrate 10. The tabs 12 and 14 extend from the roll for attachment of suitable connections.

The rolled capacitor body in turn may be protected by an encapsulation or an outer coating not shown. One suitable protective coating may be silicon dioxide applied by one of the methods described herein for laying the silicon dioxide on the substrate strip.

The silicon dioxide dielectric is preferably applied to a substrate, such as the metal strip 10, by a method in which the coating of silicon dioxide dielectric is brought into adherent and intimate contact with the substrate. One such method consists of passing an organo-oxy-silane over the substrate at around 750° C. The silicon dioxide which is thus formed deposits out on the substrate as an adherent flexible layer which is in intimate contact with the surface of the substrate.

A typical organo-oxy-silane decomposition reaction for producing a deposited layer may be as follows in the case of ethyltriethoxysilane:

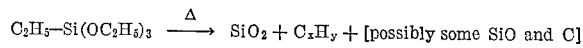

$$C_2H_5-Si(OC_2H_5)_3 \xrightarrow{\Delta} SiO_2 + C_xH_y + \text{[possibly some SiO and C]}$$

The decomposition of silanes having 3 or 4 oxygen atoms per molecule is preferred for optimum results. Other suitable silanes include tetraethoxysilane, amyltriethoxysilane, vinyltriethoxysilane, phenyltriethoxysilane, dimethyldiethoxysilane, and diphenyldiethoxysilane.

A suitable material for substrate 10 is tantalum foil. In general, any conductor having a coefficient of expansion that is compatible with the thin silicon dioxide coating can be used as the substrate, e.g., silicon, germanium, molybdenum, tungsten, and platinum.

Another method of producing the dielectric layer of this invention on a substrate is a deposition from a saturated hydrogen gas containing silicon tetrachloride. In a liquid cooled furnace tube a tantalum tape is heated to between 850° C. and 1300° C. and the saturated gas is pasesd into the tube. The silicon tetrachloride dissociates on the tantalum tape to leave a deposit of polyxalline silicon behind. By this method the silicon is gradually deposited by small increments. For example, the polyxalline silicon may be deposited on the tantalum at a rate of around 7.34 microns per minute at 1300° C.

The polyxalline deposit is converted to silicon dioxide by oxidation. This may be accomplished either by oxidizing the polyxalline deposit directly or by first modifying the deposit into the monoxalline state and oxidizing the monoxalline state. The oxidation can be carried out by introducing an oxidizing agent, such as oxygen gas or steam, directly into the deposition tube in which the deposit is formed. Or the deposit coated strip can be removed from the deposition tube and oxidized in a separate furnace suitable for oxidation.

The polyxalline silicon deposit can be made monoxalline by heating the strip coated with polyxalline silicon to a sufficiently high temperature (e.g. 2170° C.), and moving the heat source at a programmed rate along the strip. The oxidation of the deposit in the monoxalline state may be carried out as indicated above. These described methods are suitable to provide the desired product which is a completely oxidized silicon deposit which results in an adherent layer of silicon dioxide in intimate contact with the substrate strip.

Tantalum is a particularly satisfactory substrate for use with this method, as tantalum is not attacked by the corrosive metal vapors which may be developed by the evaporation of silicon tetrachloride. Also the high melting point of 2850° C. of the tantalum is an advantageous feature.

It will be understood that other methods for obtaining the silicon dioxide layer are within the scope of this invention; e.g., direct deposition of silicon dioxide by evaporation, or the evaporation of silicon monoxide onto a substrate followed by oxidation of the deposit to silicon dioxide.

A further variation of this invention is provided by the production of a layer of silicon nitride on the substrate. The dielectric layer on the substrate may be composed of silicon nitride by mixing nitrogen gas in the atmosphere of the deposit tube during the silicon deposition. The nitrogen gas is contained in the silicon chloride gas and brought into contact with the heated substrate. This results in the deposition of a silicon nitride on the layer substrate. The resultant coated substrate is suitable for incorporation in a capacitor as described above.

The deposit of silicon dioxide on a substrate such as a tantalum tape or foil provides a thin film dielectric. This thin film dielectric and its substrate are composed into a suitable capacitor which has good electrical characteristics. The coated substrate may be incorporated into a rolled capacitor as illustrated in FIGURE 2, and into a stack capacitor as shown in FIGURE 3. It will be understood, however, that advantages of this invention can be obtained by incorporating the substrate carrying its thin film of silicon dioxide or silicon nitride dielectric into any suitable capacitor body. The resultant capacitor has satisfactory capacity and dissipation factors.

A rolled capacitor body and a tantalum tape substrate have been referred to above for the purpose of illustration of the invention. Other substrates may be used, for example, the tantalum substrate may be replaced with a silicon substrate. In a preferred modification of this invention the two surfaces of strip of silicon are coated with silicon dioxide according to this invention and capacitor electrodes are applied to the respective silicon dioxide films to produce a capacitor.

It will be apparent from the above description the various embodiments that may be modified without departing from the spirit of the invention. Therefore, it is intended that the invention be limited only by the scope of the appended claims.

What is claimed is:

1. The method of making a capacitor having a dielectric film of silicon dioxide on a substrate strip which comprises the steps of heating a substrate strip of material in an atmosphere of silicon tetrachloride to dissociate the silicon tetrachloride, depositing a layer of polyxalline silicon on the substrate, subsequently oxidizing the deposited silicon to silicon dioxide, applying metal layers to the coated strip to provide electrodes, and applying lead attachments to the electrodes.

2. The method of making a capacitor having a dielectric film on a substrate strip which comprises the steps of heating a conductive substrate strip in an atmosphere of silicon tetrachloride and nitrogen gas to dissociate the silicon tetrachloride and deposit a layer of silicon nitride on the substrate, applying metal layers to the coated strip to provide electrodes, and applying lead attachments to the electrodes.

3. The method of making a capacitor having a dielectric film of silicon oxide on a tantalum strip which comprises the steps of heating a strip of tantalum to between 850° C. and 1300° C. in an atmosphere saturated with silicon tetrachloride, thereby reducing the silicon tetrachloride and depositing a layer of polyxalline silicon on the strip, subsequently oxidizing the deposited silicon to silicon dioxide, applying a metal layer to the coated strip to provide an electrode, and applying lead attachments to the electrode and the strip.

4. The method of making a capacitive device comprising the steps of heating a substrate of material having a melting point in excess of 1300° C. in a chamber at a temperature of from 850° C. to 1300° C., passing hydrogen gas saturated with silicon tetrachloride through said chamber, thereby reducing the silicon tetrachloride and depositing a layer of polyxalline silicon on the surface of the substrate, heating the silicon coated substrate to convert the polyxalline silicon to monoxalline, oxadizing the silicon layer by heating the coated strip in an oxidizing atmosphere, subsequently applying suitable electrodes to diametric surfaces of the strip, and attaching leads to form a capacitive device.

5. The method of making a capacitive device comprising the steps of heating a substrate of tantalum in a chamber at a temperature of from 850° C. to 1300° C., passing hydrogen gas saturated with silicon tetrachloride through said chamber, thereby reducing the silicon tetrachloride to deposit a layer of polyxalline silicon on the surface of the substrate, heating the silicon coated tantalum to convert the polyxalline silicon to monoxalline, oxidizing the silicon layer by heating the coated tantalum strip in an oxidizing atmosphere, and subsequently applying suitable electrodes to diametric surfaces of the strip and attaching leads to form a capacitive device.

6. A method of making a capacitive device which comprises heating a substrate in the presence of an organo-oxy-silane to decompose said silane and deposit an adherent layer of silicon dioxide in intimate contact on the substrate, subsequently applying an electrode to the silicon dioxide layer, and attaching a lead to the electrode.

7. The method of making a capacitor having a dielectric film of silicon dioxide which comprises the steps of heating a substrate strip of material in an atmosphere of a decomposable silicon composition to dissociate the composition, depositing a layer of silicon on the substrate, subsequently oxidizing the deposited silicon to silicon dioxide, applying at least one metal layer to the coated strip to provide at least one electrode and applying lead attachments.

References Cited in the file of this patent

UNITED STATES PATENTS

| 2,754,230 | McLean et al. | July 10, 1956 |
| 2,930,714 | Netherwood | Mar. 29, 1960 |
| 2,935,668 | Robinson et al. | May 3, 1960 |
| 3,012,176 | Williams et al. | Dec. 5, 1961 |